US011206198B2

(12) United States Patent
Hållmarker et al.

(10) Patent No.: US 11,206,198 B2
(45) Date of Patent: Dec. 21, 2021

(54) ABR CONTROL

(71) Applicant: Livestreaming Sweden AB, Solna (SE)

(72) Inventors: Ola Hållmarker, Sageltorp (SE); Kjell Christensson, Stockholm (SE)

(73) Assignee: LIVESTREAMING SWEDEN AB, Solna (SE)

( * ) Notice: Subject to any disclaimer, the term of this patent is extended or adjusted under 35 U.S.C. 154(b) by 0 days.

(21) Appl. No.: 16/962,109

(22) PCT Filed: Jan. 16, 2019

(86) PCT No.: PCT/EP2019/051039
§ 371 (c)(1),
(2) Date: Jul. 14, 2020

(87) PCT Pub. No.: WO2019/145202
PCT Pub. Date: Aug. 1, 2019

(65) Prior Publication Data
US 2020/0351180 A1    Nov. 5, 2020

(30) Foreign Application Priority Data
Jan. 26, 2018  (SE) .................................. 1830027-7

(51) Int. Cl.
*H04L 12/26*    (2006.01)
*H04N 21/24*    (2011.01)
(Continued)

(52) U.S. Cl.
CPC ........ *H04L 43/024* (2013.01); *H04L 43/0829* (2013.01); *H04L 43/0852* (2013.01);
(Continued)

(58) Field of Classification Search
None
See application file for complete search history.

(56) References Cited

U.S. PATENT DOCUMENTS 8,843,656 B2 * 9/2014 Gahm ................. H04L 65/4084
                                                 709/234
9,961,389 B2 * 5/2018 Phillips .............. H04N 21/8456
(Continued)

FOREIGN PATENT DOCUMENTS

EP           1521408       4/2005
WO        2017/097691      6/2017

OTHER PUBLICATIONS

International Search Report WO Application No. PCT/EP2019/051039, dated Apr. 16, 2019, 6 pages.
(Continued)

*Primary Examiner* — Lashonda T Jacobs
(74) *Attorney, Agent, or Firm* — Eversheds Sutherland (US) LLP

(57) ABSTRACT

There is provided a method for adaptive bitrate (ABR) adjustments in an IP network before making upshift of ABR level of media streams like video for live Over the Top (OTT) distribution. The invention is based on before upshifting of a current ABR level to a higher ABR level for one or more client devices, probing the network system with a higher bitrate of the data stream provided by e.g. replicating data in the data stream, and monitoring network conditions during probing. Based on the probing it is determined if the available resources in the network are sufficient to sustain an upshift of ABR-level for the client device.

16 Claims, 3 Drawing Sheets

(51) Int. Cl.
*H04L 12/811* (2013.01)
*H04N 21/2662* (2011.01)
*H04L 29/06* (2006.01)

(52) U.S. Cl.
CPC .......... *H04L 43/0894* (2013.01); *H04L 47/38* (2013.01); *H04L 65/60* (2013.01); *H04N 21/2402* (2013.01); *H04N 21/2662* (2013.01)

(56) References Cited

U.S. PATENT DOCUMENTS

| | | | |
|---|---|---|---|
| 10,313,408 B2* | 6/2019 | Phillips | H04L 65/1083 |
| 10,432,688 B2* | 10/2019 | Harden | H04L 12/4633 |
| 10,476,926 B2* | 11/2019 | Phillips | H04L 65/80 |
| 2002/0131496 A1* | 9/2002 | Vasudevan | H04N 21/6582 |
| | | | 375/240.11 |
| 2010/0121974 A1* | 5/2010 | Einarsson | H04L 47/25 |
| | | | 709/231 |
| 2014/0351638 A1 | 11/2014 | Chang | |
| 2016/0351638 A1 | 12/2016 | Im et al. | |
| 2018/0070114 A1* | 3/2018 | Phillips | H04N 21/4384 |
| 2018/0270521 A1* | 9/2018 | Lindgren | H04L 47/822 |

OTHER PUBLICATIONS

Office Action dated Sep. 30, 2020 for related Sweden Patent Application No. 1830027-7 (6 pages).

* cited by examiner

ABR CONTROL

CROSS-REFERENCE TO RELATED APPLICATIONS

This application is the National Stage of International Application No. PCT/EP2019/051039, filed Jan. 16, 2019, which claims priority to Swedish patent Application No. 1830027-7, filed Jan. 26, 2018, both of which are hereby incorporated by reference in their entireties.

FIELD OF THE INVENTION

The present invention relates to broadcasting and media distribution over IP networks, and more particularly to Adaptive Bit Rate (ABR) adjustments of media streams like video for live Over the Top (OTT) distribution.

BACKGROUND OF THE INVENTION

In media distribution over an IP network, such as video and TV distribution over the Internet, the bandwidth to a client device will vary depending on various circumstances. When accessing the distributed media content over a mobile data network or a Wi-Fi network the capacity is shared between client devices. Further, individual client devices might enter locations with weaker or stronger signal affecting the bandwidth received by the client.

Today, variation in bandwidth as conceived by the client device is typically handled by three mechanisms: congestion avoidance mechanisms of TCP (transmission control protocol of the TCP/IP protocol stack), buffering, and adjusting the video bitrate (ABR). Basically, congestion avoidance is handled by the TCP protocol stack which adjusts the retransmission rate of lost packets to adapt the client device to use a fair share of the available bandwidth in the network (or actually in the bottleneck of the transmission). In such system, the client device needs to buffer data since it is not certain the network can offer enough bandwidth required by the video stream. In order to maintain the viewer experience the client device needs to have video data to present, so buffering is needed to absorb variances in bitrate introduced by the network, specifically by the TCP congestion avoidance mechanisms and the jitter introduced by the network. As the capacity and jitter varies in the IP network, the receiving client device must pause the presentation of the current video on the screen to accumulate more video data in its buffer. The accumulation is one method, meaning that the delay will increase and not decrease for a specific session. Such adjustments will introduce delay and the video cannot be considered live distribution due to the added delay.

According to the European Broadcasting Union, EBU, which defines TV standards in Europe, live TV is defined as a broadcasting delay from the ingress to the client device display or screen lower than seven seconds. Delay caused by the adjustments above may however end up in several minutes of delay.

More specifically, one of the most common ways to distribute video over the Internet is to use HLS (HTTP Live Streaming) or MPEG-DASH where the video stream is divided into typically 10 second (2-10 sec) video files (segments) making the linear video stream a series of 10 second video files. Every stream is typically represented by several bitrates (different video qualities), each being segmented into equivalent segment files. The client device then requests these files using normal http technology. To ensure that the client device always has video data to present, at least 3 time wise consecutive files are buffered in the device. This means that buffering will impose at least 30 seconds of delay. At start-up the buffer is filled up to a certain level, typically 30 seconds, corresponding to three 6-30 seconds segments. If packets are lost, the transport protocol TCP used by the HTTP protocol requests the data again and if uncertain if it can recover the whole segment file, also reduces the bitrate by requesting the next corresponding segment file of a lower bitrate to avoid congestion. The player needs to wait to fill up the buffer again and therefore, the initial delay is increased and cannot be recovered since the video cannot be played faster to recover the increased delay. This problem is normally called drift.

Over IP networks the bandwidth of a distributed video, i.e. the encoded bitrate of the video, is adjusted to the bandwidth available in the network to the client device. The video is encoded in different predefined bitrates (i.e. the level of compression of the video is differentiated, which in turn provides different quality levels of the video). This is typically done by a transcoding system which takes in an encoded video stream and then transcode it into one or several video streams with different bitrates, qualities and formats for different devices. The ABR algorithm decides which encoded bitrate is applicable for the specific moment and selects the most suitable video quality to transfer to the client. In existing solutions, ABR adjustments, i.e. adjustment of the video bitrate/quality, are done based on the fill level of the buffer of the client device. More particularly, the decision to change to another encoded bitrate is done by monitoring the buffer fill level in the client device. A decreasing fill level indicates that the bandwidth of the network is lower than needed and the system needs to select a video with lower quality. Shifting to a higher quality video stream is done by simply switching to a higher video bit rate and watching if the buffer fill level decreases. If it decreases, the system needs to go back to a lower video bit rate. In addition, rendering limitation also matters in deciding ABR level. This means that there will be continuous changes in ABR levels during the operation with the exception if the system is running on the highest ABR level and the buffer is not becoming empty. To avoid glitches in the video when changing between bit streams of different bit rates, the change is performed between segments, i.e. one start using the corresponding new segment of the new bitrate stream.

Although this approach to perform ABR adjustments of video by monitoring the buffer fill level may be applicable for video on demand services, there is a need for an improved method to perform ABR adjustments for video in IP network systems since the buffering of multiple segments at the device and possibly also in edge caches, and also the continuous adjustments of the ABR level increases the buffer fill level at the device, thereby increasing the delay before the video is displayed in the device. The accumulated delay happens because imperfections of using TCP to determine the network bit rate (which continuously is changing) force the client device to buffer more video data to avoid the buffer to run empty which in turn disrupts the video presentation. Typically, today's OTT systems start with an initial delay of 30-60 seconds depending on encoding delay, segment sizes, distribution network and client player implementation. This accumulates over time and e.g. the HLS protocol allows a client to buffer up to 15 minutes.

Shifting up the ABR level is more challenging then shifting down because when shifting down there is indication that the current capacity is not sufficient and there is a need to reduce. For shifting up, there is only an indication that it works well so a new, higher ABR level may be applicable or not.

SUMMARY OF THE INVENTION

It would be advantageous to provide an improved method for ABR adjustment which facilitates live distribution of media content, such as TV/video/audio streams, in an IP network like the Internet.

This object is achieved by a method according to the present invention as defined in the appended claims, which are directed to a mechanism for controlling upshift of ABR level for client devices in a network without overloading the network or impairing on the user experience.

In accordance with an aspect of the present invention, a method is provided for ABR adjustments in an IP network comprising before an upshift of an ABR level, initiating probing of the network to decide if at least one candidate bitrate, which is higher than a pre-set bitrate of a client device data stream, is applicable. The step of probing comprises increasing a transfer bitrate of the client data stream. The method further comprises monitoring at least one network characteristics, and determining based on the monitored network characteristics if the candidate bitrate is applicable, which advantageously provides fewer adjustments of the ABR level in a network, and reduces the risk of setting a new ABR level which consumes too much capacity, and in addition which reduces the risk of compromising the current image quality or even of causing an interruption of the service. In a system with a number of discrete ABR levels, the system can utilize probing to investigate whether an upshift of the ABR level, by one or optionally more steps at a time, for a client is possible before requesting an upshift of the ABR level to a higher ABR level which is indicated as applicable in the probing session.

The inventive concept advantageously ensures that the viewer gets the best quality given the current network condition (with respect to capacity, loss, etc.) by adjusting the ABR level upwards only when the network capacity allows it. By probing the network before increasing the ABR level, thereby testing if the candidate bandwidth is applicable by monitoring the network characteristics response to the increased transfer bitrate, early detection of problems with an upshifted ABR level is detected, in advance of trying to upshift the ABR-level of the client device, and thus the number of adjustments is reduced making the service more stable.

The pre-set bitrate of the client device data stream is herein defined as information regarding a present ABR-level and/or encoded bitrate of the media stream, i.e. the expected or target bitrate to be received at the client device when the Quality of Service in the IP network is sufficient. The step of adjusting the pre-set bitrate may include requesting media stream transfer with a different ABR-level and/or a different encoded bitrate from an origin server, edge cache server (CDN), or last mile streaming server.

The step of increasing the transfer bitrate comprises increasing the transfer bitrate by at least one of replicating data or packets, and replicating data or packets based on packet groups in the client device data stream. Using replicated data to introduce an extra probing bandwidth is advantageous, since a packet that gets lost e.g. due to the probing can be replaced in the client reorder-buffest with its replicate. FEC (Forward Error Correction) is an alternative to use. However, FEC introduces significant delay which is not desired in low latency OTT solutions.

According to an embodiment of the method added data, replicated data or packets, or replicated data or packets based on packet groups, are distributed in the client device data stream according to at least one of randomly (or semi-randomly), according to a predetermined pattern, and based on groups, which is advantageous.

According to an embodiment of the method, the network characteristics comprises at least one of: packet delay variation, distribution of packet loss, packet loss level, and packet delay, which is advantageous to detect if the network does not have enough capacity to support an upshift in ABR-level. Packet delay and/or packet delay variation can be monitored e.g. by comparing time stamps at ingress and egress for packets in the client data stream. If the difference increases, this indicates that buffers in the network equipment is filling up as a result of increased load or congestion of the network.

According to an embodiment of the method, the method further comprises aborting said probing if increase in packet loss or increase in packet delay is detected. Thus an early detection of congestion caused by lack of bandwidth is provides which is advantageous.

According to an embodiment of the method, the step of initiating is triggered by one of: a client probing request, a client request for an increased ABR level, a predetermined frequent time interval, and a predetermined time period has passed after one of: a successful probing, a failed probing, a down shift of the client device ABR level, and an up shift of the client device ABR level. Each time period may be selected as predetermined constants, or be selected according to a function, e.g. exponential increase of the time period for failed consecutive probing sessions. By probing the network regularly, or after predetermined time periods after events like a successful/failed probing etc. as described above, overload of the network due to upshifts or due to too frequent or intensive probing of the network is avoided while still matching the ABR-level with the actual capacity of the network (i.e. while not remaining at a lower ABR-level longer than necessary). Further, according to an embodiment of the method, the step of initiating probing is triggered by the client device switching from one network to another, e.g. from a cellular data connection, e.g. 4G, to Wi-Fi and/or experiences a significant increase in signal strength.

According to an embodiment of the method, the step of replicating data is performed to simulate an increase of the transfer bit rate to a value selected between 100 to 150% of the candidate bitrate, i.e. of the candidate ABR level bandwidth, and preferably 125% of the candidate ABR level bandwidth, which is advantageous to ensure that the network can handle the candidate ABR-level for the client device without causing network problems for the client device or other client devices which shares the same bandwidth.

According to an embodiment of the method, the step of increasing the transfer bitrate is performed stepwise, or by ramping the transfer bitrate according to a predetermined increase rate. Ramping of the transfer bitrate may for instance be performed according to a linear increase, a logarithmic increase, etc. and is advantageous as this allows early detection of problems without overloading the network, optionally by aborting the probing in time, and in which case an upshift in ABR-level never takes place.

As previously mentioned, probing may be performed for more than one candidate bitrates (i.e. for more than one ABR-level) by a probing sequence/session where increasing candidate bitrates are tested in consecutive steps, or where the probing sequence increases the candidate bitrate by ramping the transfer bitrate through increasing candidate bitrate levels. A decision to upshift the ABR-level will thus not necessarily be taken because probing of one particular candidate bitrate succeeds, or at least not without testing a higher candidate bitrate first.

According to an embodiment of the method, the method further comprises sending a probe response indicating if the candidate bitrate is applicable or not, i.e. the client device has not experienced loss of data, delay of data, etc. which exceeds a predetermined threshold level. Alternatively, a successful probing can be indicated based on if the probing is not aborted within a predetermined time period.

According to an embodiment of the method, at least one of the steps of initiating, monitoring and determining is performed at said client device.

According to an embodiment of the method, it further comprises transmitting ping messages (heart beats) from said client during probing, and if no ping message is received by the server, e.g. within a predetermined time or the ping message frequency decreases, aborting said probing. Heavy load/congestion in the network may be indicated by not receiving the ping message. The probing is aborted not to further worsen the situation.

According to an embodiment of the method, the probing is performed according to an ABR probing profile, wherein said ABR probing profile is preferably based on client device type and/or network type. This is advantageous to avoid probing for ABR-levels which are not applicable for a client device.

According to an embodiment of the method, the ABR probing profile is one of a factory setting, received from an external source or is sent to the client device in response to a stream allocation request. Centrally controlling the ABR-profiles facilitates for fair distribution of resources between client devices connected to the same network (area).

According to an embodiment of the method, it further comprises selecting the candidate bitrate from a list of available bitrates, which is advantageous as no dedicated transcoding per device is required, thus less back end processing is required.

According to an aspect of the inventive concept, the method further comprising coordinating probing sessions of multiple client devices in the same subnetwork by: time multiplexing probing sessions of the multiple client devices, and/or selecting respective candidate bitrates according to a predetermined distribution among client devices, which coordination advantageously achieve a fair distribution of available bandwidth between the client devices which share resources.

According to an aspect of the invention, there is provided a node in a communication network comprising means for performing a method according to the inventive concept.

According to an aspect of the invention, there is provided a software module adapted to perform a method according to the inventive concept, when executed by a computer processor.

Embodiments of the present inventive method are preferably implemented in node to node communication by means of a module for signaling and data transport in form of software, FPGA, ASIC or other suitable arrangement, adapted to perform the method of the present invention (not shown). The software module and/or data-transport module may be integrated in the node comprising suitable processing means and memory means, or may be implemented in an external device comprising suitable processing means and memory means, and which is arranged for interconnection with an existing node.

Those skilled in the art realize that different features of the present invention can be combined to create embodiments other than those described in the following.

DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Figure 1:
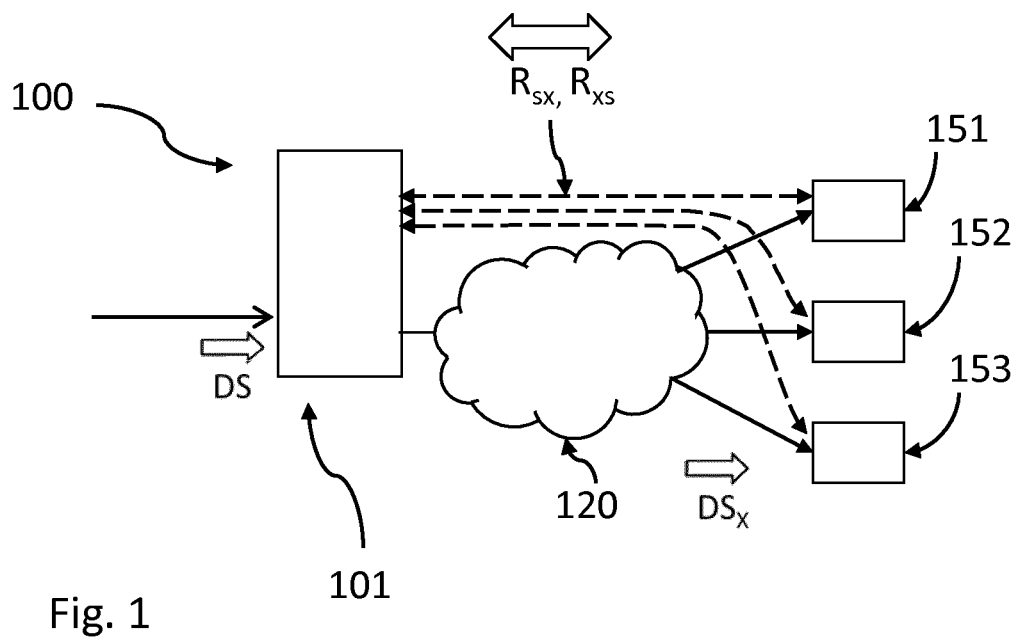
FIG. 1 is a schematic block diagram illustrating a media distribution system according to embodiments of the present inventive concept.

FIG. 1 is a block diagram schematically illustrating a media distribution system 100 of IP type for live distribution of e.g. video, in view of which aspects of the inventive concept will be described. From an ingress point (not shown), e.g. a broadcast location (TV network, local TV studio, cable system, etc.), an original encoded media stream is at some point in the network re-encoded in transcoders, into media content in packet streams with different quality, here represented as media streams high H, medium M, and low L. The media content DS is distributed via a primary network (not shown) to a playout server 101, from which a multiple of client devices, here client device 151-153 at different viewer locations, each requests a respective media stream represented by $DS_x$ in FIG. 1 of a selected quality level (H, M, L) to display which is transported via the secondary network 120 over a respective communication link, which is typically provided over a computer network (e.g. a LAN a WAN, the Internet), a wireless network (e.g. a cellular data network), or some combination of these network types. The primary distribution network and the secondary network 120 do not need to be dedicated networks but can be shared with other services.

Requests and other information exchange, illustrated as $R_{sx}$, $R_{xs}$ in FIG. 1, can be made per client device between the respective client device and the playout server 101 (or optionally a dedicated server) handling control communication from the client devices 151-153. The selected quality level is associated with an expected ABR level (corresponding to encoded/transcoded pre-set bitrate level, or transfer bitrate $B_t$ from the source) which, as long as the bandwidth capacity of the network 120 is sufficient, will be received as a received bitrate at the client device. The client devices 151-153 each comprises means for processing received media content and to select media content to display. The shown network system is further arranged for employing mechanisms of the present inventive concept at the playout server 101 and/or client device 151,152,153 over the secondary network 120 to determine if an upshift the ABR-level for a client is possible and optionally to request or employ a suitable new higher video bitrate.

Figure 2:
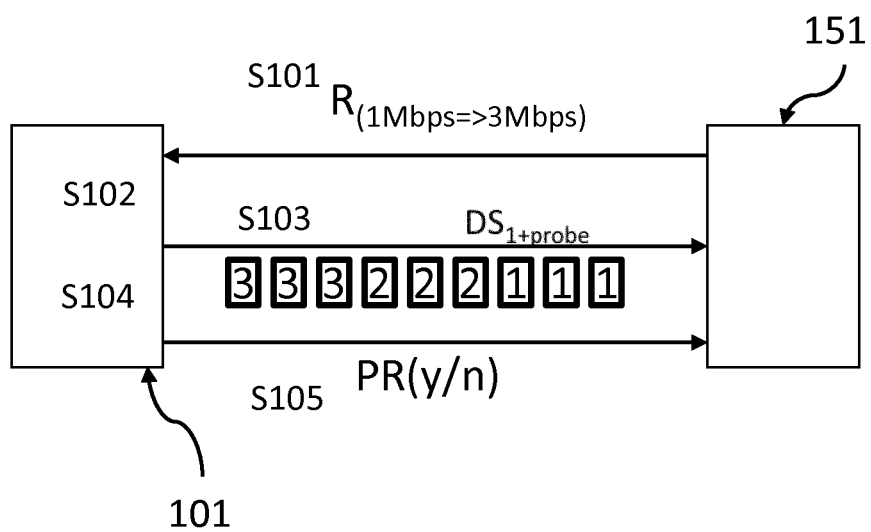
FIG. 2 is a schematic illustration of an embodiment of the present inventive concept.
Figure 6:
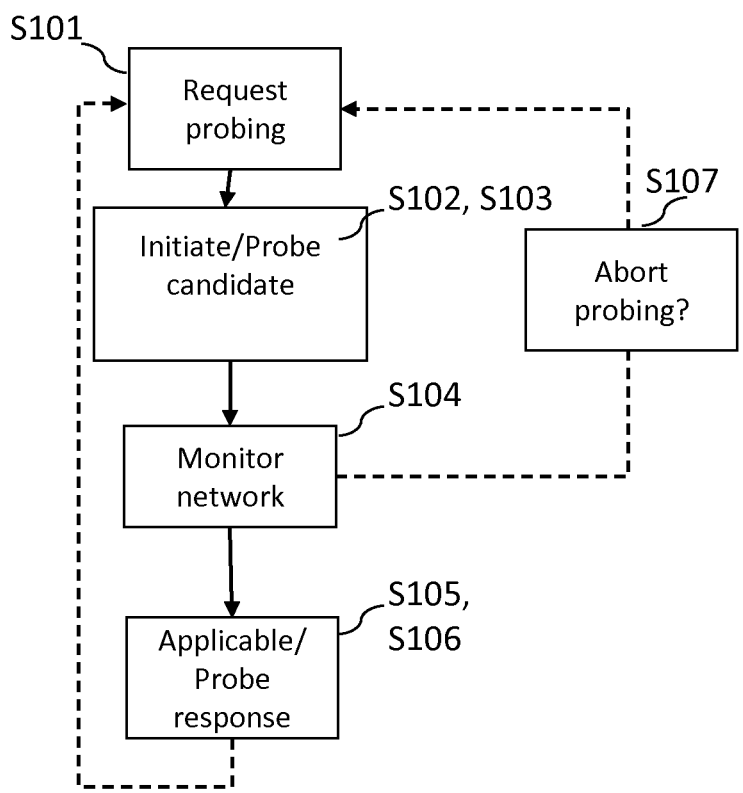
FIG. 6 is a flow chart illustrating an embodiment of a method according to the present inventive concept.

Consider now that media content DS represented by four ABR-levels, ABR1 corresponding to a transfer bitrate of 0.5 Mbps, ABR2 corresponding to a transfer bitrate of 1 Mbps, ABR3 corresponding to a transfer bitrate of 3 Mbps, and ABR4 corresponding to a transfer bitrate of 5 Mbps is available at the playout server 101. Client device 151 is currently receiving media content in data stream $DS_1$ with ABR2, i.e. a transfer bitrate of 1 Mbps from the playout server 101. Referring now to FIGS. 2 and 6, to test if the network capacity in the secondary network 120 supports an upshift to ABR3 with a candidate bitrate of 3 Mbps, (step S101: request probing) the client device 151 sends a probe request R(1 Mbps=>3 Mbps), i.e. a request to test if upshift to a candidate bitrate of 3 Mbps is applicable, to the playout server 101. The playout server (step S102: initiate probing) initiates a probing session in response to the probe request from the client, and (step S103: probing) probes the network by increasing the transfer bitrate of data stream $DS_1$ to the candidate bitrate of 3 Mbps, which in this example is performed by providing two extra replicas of each consecutive packet (here represented as packets 1, 2, 3, and $DS_{1+probe}$ in FIG. 2) of the data stream $DS_1$ with ABR2, thereby increasing the transfer bitrate to the candidate bitrate of the data stream without actually switching ABR-level, while monitoring (step S104: monitoring) network characteristics, here roundtrip time, and (step S105: determining if applicable) determining if the candidate bitrate is applicable and optionally (step s105: probe response) sending a probe response PR(y/n) to the client indicating if the candidate bitrate is applicable or not, i.e. if the client device can request ABR3, with transfer bitrate 3 Mbps without compromising the quality of the service.

According to an embodiment of the inventive concept, the probing sessions of multiple client devices are coordinated within a sub network, or at least between a group of client devices that share the same resources. One exemplifying coordination scheme is based on providing time multiplexing of probing sessions of the multiple client devices. According to an embodiment of the time multiplexing coordination scheme, the client devices 151-153 in FIG. 1, or preferably the server 101, coordinates probing for a respective higher ABR-level for the client devices in due succession, such that each client device has a fair chance to upshift its ABR-level. Further, the selection of allowed respective candidate bitrates to probe for may be selected according to a predetermined distribution among the client devices. For instance, according to an embodiment of such a distribution of allowed ABR-levels between client devices, this may comprise before allowing a client device to upshift ABR-level more than one step, allowing other client devices to upshift ABR-level first.

To continue, the step of initiating probing is according to different embodiments of the method triggered by one of a client probing request, a client request for an increased ABR level, a predetermined first time period, e.g. 3 seconds, has passed after a successful probing, or if a probing fails a predetermined second time period, which is longer than the first time period, e.g. 3 min, a predetermined third time period has passed after a downshift of the client device ABR level, e.g. 30 sec, a predetermined fourth time period, e.g. 3 sec, has passed after an upshift of the client device ABR level, and a predetermined frequent time interval. The examples values given for the first-, second-, third-, fourth time period are merely exemplifying, other time periods are applicable. Thus, initiating probing can be performed as a response to the previous behaviour of the system or initiated based on pre-set time periods, or be requested.

Step s104 may involve monitoring network characteristics such as at least one of packet delay variation, distribution of packet loss, packet loss level, and packet delay.

The steps as described above can according to embodiments of the method be performed in the client device, for instance at least one of initiating probing, monitoring network characteristics and determining if the probing is successful, i.e. that the candidate bitrate/ABR-level is applicable. According to other embodiments, the steps are performed in the server.

Figure 3:
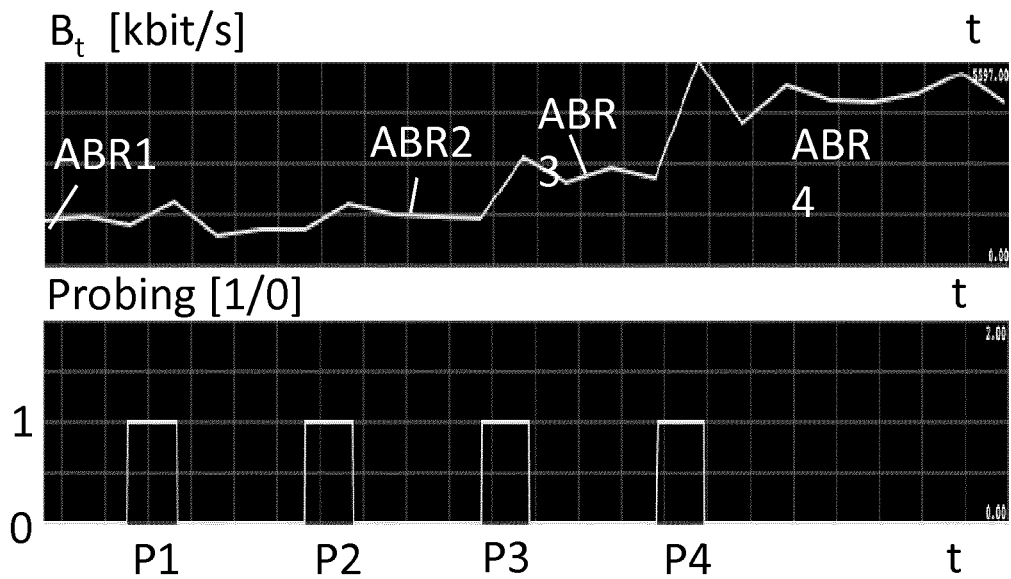
FIG. 3 illustrates an exemplifying measurement set of transfer bitrate during probing sequences.

Probing is performed by providing an increase of the transfer bitrate to a value preferably selected between 100 to 150% of the candidate bitrate, and preferably to 125% of the candidate bitrate. The increase of the transfer bitrate $B_t$ can be performed stepwise, as described above with reference to FIG. 2, or by ramping the current transfer bitrate (linearly or according to some other function, e.g. exponential increase) to e.g. 125% of the candidate bitrate, or some other applicable method. Replicating of data to increase the transfer bitrate during probing can be performed in different ways as further described below. Increasing the transfer bitrate may be performed with a predetermined increase rate, as illustrated in the example in FIG. 3 which are test measurements illustrating how reoccurring probing sessions P1, P2, P3 and P4, are performed (is probing), here with a predetermined frequency. During each probing session P1-P4 in FIG. 3, the increase in transfer bitrate $B_t$ is performed by linear ramping, see e.g. increase of transfer bitrate $B_t$ but no upshift from ABR-level ABR1 at first probing P1, increase of transfer bitrate $B_t$ and an upshift from ABR-level ABR1 to ABR-level ABR2 at second probing P2, increase of transfer bitrate $B_t$ and an upshift from ABR-level ABR2 to ABR3 at third probing P3, and increase of transfer bitrate $B_t$ and upshift from ABR-level ABR3 to ABR4 at fourth probing P4. As the probing sessions P1-P4 are performed the roundtrip time (RTT) is measured to determine (based on an increase in RTT as a measure of increased delay in the network) if upshift of the ABR-level is applicable.

Figure 4A:
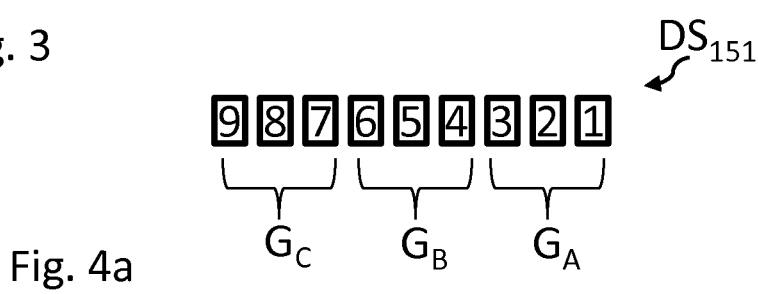
FIGS. 4a-4c illustrates different replication schemes according to an embodiment of the present inventive concept.
Figure 4B:
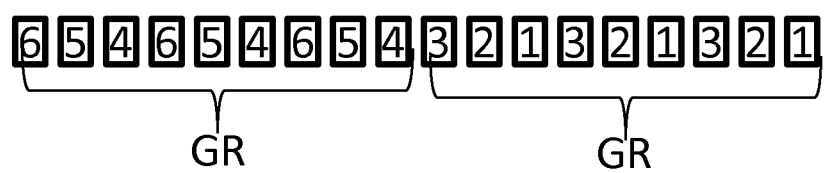
Figure 4C:
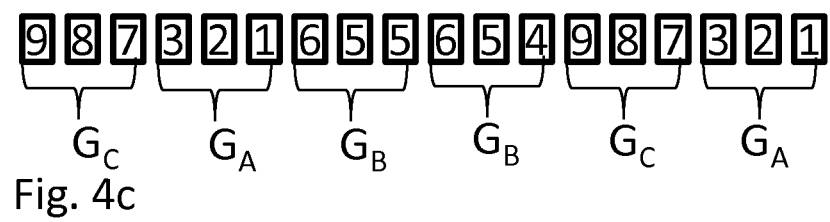

According to an embodiment of the method, the increase in transfer bitrate during probing is provided by replicating data. In the example presented with reference to FIG. 2, consecutive packets of the client device data stream are replicated to increase the transfer bitrate of the client device data stream to a required candidate bitrate or alternatively to a value between 100%-150% of a requested candidate bitrate and outputted according to a pattern, i.e. each replica was outputted directly correlated to its original. In alternative embodiments, the replicated data may be output according to other predetermined patterns, e.g. correlated to other packets, or data, then its originator, or optionally according to a random or semi-random distribution with respect to the order of the outgoing packet stream. Further, according to an embodiment of the method the replicated data or data packets are replicated and distributed into outgoing client device data stream according to a predetermined pattern based on groups. Referring now to FIG. 4, as an example, a data stream $DS_{151}$ of client device 151 is illustrated as packets 1-9, as illustrated in FIG. 4a. A request for probing testing a candidate level which is 100% of a three times higher transfer bitrate than the present ABR-level initiates a probing in which groups G of the data packets in $DS_{151}$ are replicated. Here each group G is determined to include 3 packet for sake of a simple illustration. Each group G, e.g. $G_A$ which contains packets 1-3, is thus replicated 3 times forming a replicate group GR, see FIG. 4b, which are then transferred in the outgoing data stream. Another option is to scramble the outgoing data stream such that replicas of groups G, are distributed in the outgoing data stream as illustrated for groups $G_A$, $G_B$ and $G_C$ in the outgoing data stream illustrated in FIG. 4c.

Since probing according to the present inventive concept could potentially congest the network due to the increased bandwidth, such that packets cannot get through to the client devices, according to an embodiment of the method it further comprises aborting the probing (step S107, in FIG. 6). Abort of the probing is according to an embodiment performed if for instance an increase in packet loss or increase in packet delay is detected. Another manner of controlling the probing mechanism is to instruct the client device to transmit ping messages (heart beats) during probing, and if no ping message is received (e.g. within a predetermined time period) or if the frequency of ping messages decreases below some threshold value, which would indicate that the network capacity is decreasing, or that the client device wants to abort the probing and hence stops transmitting ping messages, the probing is aborted. Missing probes can be a result of network congestion or that the client aborts the probe by stop sending ping.

Figure 5:
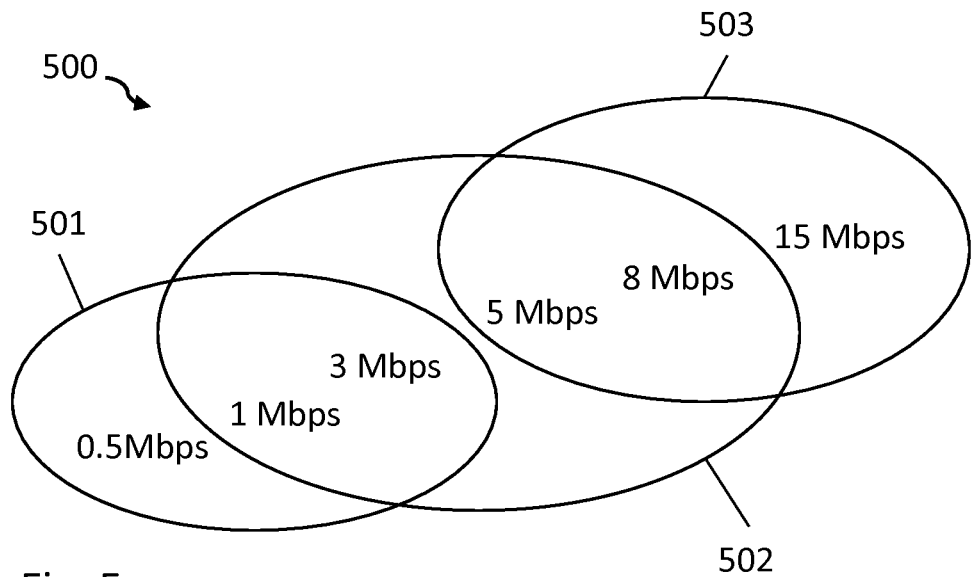
FIG. 5 is a schematic illustration of different ABR profiles.

According to an embodiment of the method, the probing is performed according to an ABR profile. ABR profiles are subsets selected from all available ABR levels, where each ABR profile is adapted to the client device capacity, or specific applications which are run on the client device, platform etc. For instance, an ABR profile for a wired STB would be selected differently that an ABR profile for a mobile device on 3G, see FIG. 5 which illustrates a channel 500 with six available ABR levels: 0.5 Mbps, 1 Mbps, 3 Mbps, 5 Mbps, 8 Mbps, 15 Mbps. For a phone on 3G 501, the ABR probing profile may be selected to include [0.5 Mbps, 1 Mbps, 3 Mbps], for a tablet on Wi-Fi 502 the ABR probing profile may be selected to [1 Mbps, 3 Mbps, 5 Mbps, 8 Mbps], and for a Wired STB 503 the ABR probing profile may be selected to [5 Mbps, 8 Mbps, 15 Mbps]. Today, bitrate limitation is supported in applications which can be constrained playback with max/min values of the Bandwidth. By introducing ABR profiles that are configured in the back end, user experience is improved by not exposing too high ABR levels to client devices which do not have the capacity to handle these higher ABR levels. By this, unnecessary probing is avoided. The ABR probing profile may be one of a factory setting, received from an external source or is sent to the client device in response to a stream allocation request.

The invention claimed is:

1. A method for adaptive bitrate (ABR) adjustments in an Internet Protocol (IP) network comprising:
    initiating probing of the IP network to decide if at least one candidate bitrate, which is higher than a pre-set bitrate of a client device data stream, is applicable;
    wherein said probing comprises:
    increasing a transfer bitrate of said client device data stream by replicating data or packets of said client device data stream;
    monitoring at least one network characteristics; and
    determining based on said monitored at least one network characteristics if the candidate bitrate is applicable.

2. The method of claim 1, wherein said step of increasing the transfer bitrate is performed stepwise, or by ramping the transfer bitrate level according to a predetermined increase rate.

3. The method of claim 1, wherein replicating data or packets is based on packet groups in the client device data stream.

4. The method of claim 3, wherein said data or packets that are replicated based on packet groups are distributed in the client device data stream according to at least one of: randomly, according to a predetermined pattern, or based on groups.

5. The method of claim 1, wherein a maximum transfer bit rate tested during probing is selected between 100% to 150% of the candidate bitrate.

6. The method of claim 1, wherein said network characteristics comprises at least one of:
    packet delay variation,
    distribution of packet loss,
    packet loss level, and
    packet delay.

7. The method of claim 6, further comprising aborting said probing if increase in packet loss or increase in packet delay is detected.

8. The method of claim 1, wherein said step of initiating is triggered by one of:
    a client probing request;
    a client request for an increased ABR level;
    a predetermined frequent time interval;
    a change of network;
    an increase in signal strength detected by the client device; and
    a predetermined time period has passed after one of: a successful probing, a failed probing, a down shift of the client device ABR level, and an up shift of the client device ABR level.

9. The method of claim 1, further comprising sending a probe response indicating if the candidate bitrate is applicable or not.

10. The method of claim 1, for use in a client device, wherein at least one of said steps of initiating, monitoring and determining is performed at said client device.

11. The method of claim 1, further comprising transmitting ping messages from said client during probing, and if no ping message is received by the server aborting said probing.

12. The method of claim 1, wherein said probing is performed according to an ABR probing profile.

13. The method of claim 12, wherein the ABR probing profile is one of a factory setting, received from an external source or is sent to the client device in response to a stream allocation request.

14. The method of claim 1, further comprising coordinating probing sessions of multiple client devices by:
    time multiplexing probing sessions of said multiple client devices, or
    selecting respective candidate bitrates according to a predetermined distribution among client devices.

15. A node in a communication network comprising at least one processor configured to performing operations comprising:
    initiating probing of the communication network to decide if at least one candidate bitrate, which is higher than a pre-set bitrate of a client device data stream, is applicable;

wherein said probing comprises:
increasing a transfer bitrate of said client device data stream by replicating data or packets of said client device data stream;
monitoring at least one network characteristics; and
determining based on said monitored at least one network characteristics if the candidate bitrate is applicable.

16. A device comprising:
a software module, memory, and one or more computer processors coupled to the memory, wherein the software module, when executed by the one or more computer processors, is configured to perform operations comprising:
 initiating probing of a network to decide if at least one candidate bitrate, which is higher than a pre-set bitrate of a client device data stream, is applicable;
wherein said probing comprises:
 increasing a transfer bitrate of said client device data stream by replicating data or packets of said client device data stream;
 monitoring at least one network characteristics; and
 determining based on said monitored at least one network characteristics if the candidate bitrate is applicable.

* * * * *